(12) United States Patent
Monaharan et al.

(10) Patent No.: US 10,452,650 B1
(45) Date of Patent: Oct. 22, 2019

(54) DATA QUERYING

(71) Applicant: Google LLC, Mountain View, CA (US)

(72) Inventors: Gokulnath Babu Monaharan, Mountain View, CA (US); Stephan Joerg Ellner, San Francisco, CA (US); Stephan Gudmundson, Los Altos, CA (US); Apurv Gupta, Bangalore (IN); Sridatta Ghegu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 345 days.

(21) Appl. No.: 15/259,872

(22) Filed: Sep. 8, 2016

(51) Int. Cl.
*G06F 16/242* (2019.01)
*G06F 3/048* (2013.01)

(52) U.S. Cl.
CPC .......... *G06F 16/2425* (2019.01); *G06F 3/048* (2013.01); *G06F 16/2445* (2019.01)

(58) Field of Classification Search
CPC combination set(s) only.
See application file for complete search history.

(56) References Cited

U.S. PATENT DOCUMENTS

2005/0155016 A1* 7/2005 Bender .................. G06F 8/35 717/106
2011/0082825 A1* 4/2011 Sathish ............... G06Q 30/08 706/46

OTHER PUBLICATIONS

Ananthanarayanan et al., "Photon: Fault-tolerant and scalable joining of continuous data streams," Proceedings of the 2013 ACM SIGMOD International Conference on Management of Data, pp. 577-588, Jun. 2013.
Armbrust et al., "Spark SQL: Relational Data Processing in Spark," SIGMOD '15 Proceedings of the 2015 ACM SIGMOD International Conference on Management of Data, pp. 1383-1394, May-Jun. 2015.
Chang et al., "Bigtable: A distributed storage system for structured data," TOCS, 26(2):4, 14 pages, Jun. 2008.
Chaudhuri et al., "An overview of data warehousing and OLAP technology," ACM SIGMOD Record, 26(1):65-74, 1997.
Corbett et al., "Spanner: Google's globally distributed database," TOCS, 31(3):8, 22 pages, Aug. 2013.
Effelsberg et al., "Principles of database buffer management," TODS, 9(4):560-595, Dec. 1984.
Goel et al., "Towards scalable real-time analytics: An architecture for scale-out of OLxP workloads," PVLDB, 8(12):1716-1727, Aug. 2015.
Gupta et al., "Mesa: Geo-replicated, near real-time, scalable data warehousing," PVLDB, 7(12):1259-1270, Aug. 2014.
Haas et al., "Optimizing queries across diverse data sources," in VLDB, pp. 276-285, 1997.
Lahiri et al., "Oracle TimesTen: An in-memory database for enterprise applications," IEEE Data Eng. Bull., 36(2):6-13, 2013.

(Continued)

*Primary Examiner* — Shyue Jiunn Hwa
(74) *Attorney, Agent, or Firm* — Fish & Richardson P.C.

(57) ABSTRACT

A view gateway is configured to receive a first query in a first programming language from a client. The view gateway is configured to select a template from a plurality of templates. A view gateway is configured to compile the first query and the selected template into a second query. A view gateway is configured to send the second query to a data store for processing. A view gateway is configured to receive a query result that is responsive to the second query; and send the query result to the client.

23 Claims, 5 Drawing Sheets

(56) References Cited

OTHER PUBLICATIONS

Mohan et al., "ARIES: A transaction recovery method supporting fine-granularity locking and partial rollbacks using write-ahead logging," TODS, 17(1):94-162, Mar. 1992.
Olston et al., "Pig Latin: A not-so-foreign language for data processing," Proceedings of the 2008 ACM SIGMOD international conference on Management of data, p. 1099-1110, Jun. 2008.
Shute et al., "F1: A distributed SQL database that scales," PVLDB, 6(11):1068-1079, Aug. 2013.
Stonebraker, "Operating system support for database management," Communications of the ACM, 24(7):412-418, Jul. 1981.
Vassiliadis et al., "A survey of logical models for OLAP databases," ACM SIGMOD Record, 28(4):64-69, Dec. 1999.
Yan et al., "Performing group-by before join," in ICDE, pp. 89-100, 1994.
Zhou et al., "SCOPE: Parallel databases meet MapReduce," VLDB Journal, 21(5):611-636, 2012.

\* cited by examiner

DATA QUERYING

BACKGROUND

Computer data stores hold and organize collections of data. Data stores include collections of schemas, tables, queries, reports, views, and other objects. The data in data stores are typically organized to model aspects of reality in a way that supports processing such as responding to queries requesting a change or report of the data. Some data stores are relational databases.

Query programming languages are programming languages that can be used to make queries in data stores and information systems. Structured Query Language, or SQL, is a special-purpose query programming language designed for managed data held in data stores such as relational databases.

SUMMARY

In general, one innovative aspect of the subject matter described in this specification can be embodied in systems that include a view gateway configured to receive a first query in a first programming language from a client, the first query including first parameters and a template identifier; select a template from a plurality of templates based on the template identifier; compile the first query and the selected template into a second query in a second programming language, the second query including second parameters generated based on the first parameters and on the selected template; send the second query to a data store for processing; receive a query result that is responsive to the second query; and send the query result to the client. The systems further include a client configured to send the first query to the view gateway; and receive the query result from the view gateway. The systems further include a data store configured to receive the second query from the view gateway; and process the second query; and send the query result to the view gateway. Other embodiments of this aspect include corresponding systems, apparatus, and computer programs, configured to perform the actions of the methods, encoded on computer storage devices.

These and other embodiments can each optionally include one or more of the following features. The view gateway comprises a request handler configured to select the selected template from the plurality of templates based on the template identifier matching a property of the selected template; and a query compiler configured to generate the second query from the first parameter and the selected template after the request handler selects the selected template. Each of the templates comprise a sequence of subquery assignment statements that assign a data variable of the template to the value of a parameter of one of the group consisting of i) a parameter of a query and ii) a parameter of a template. One template in the plurality of templates is an entry point that specifies a beginning of execution, and wherein all other templates are dependent from the entry point. The first query does not identify an aggregation of the query results; and to compile the first query and the selected template into the second query in the second programming language, the view gateway is configured to determine an aggregation of the query results. To determine the aggregation of the query results, the view gateway is configured to automatically identifying grouping columns in the query results such that rows having the same key values in the grouping columns are to be aggregated. The client is configured to present, to a user, a plurality of user interfaces, each user interface being associated with a template of the plurality of templates; receive, from the user, input to a particular user interfaces; generate the first parameters based on receiving the input; determine that the particular user interface is associated with the selected template; and send the first query to the view gateway responsive to determining that the particular user interface is associated with the selected template. The system comprises a query engine; and a plurality of databases; wherein the query engine is configured by process the second query based on data stored in at least some of the plurality of databases. A particular databases comprises a plurality of shards created from rows of a table of the particular database, wherein each row is associated with the client; and wherein the particular database is configured to use the plurality of shards to cache data of the particular database The systems and processes described here may be used to provide one or more of the following advantages. User interfaces that provide access to large, distributed databases can be updated with low latency and provide users with fresh data. For example, this document describes technology that can be used to query data stores for data to be provided to user interfaces. These technologies can be configured so that queries are run directly on data stores holding the data, as opposed to caches or copies of the data that may become out of date.

Development of the user interfaces can be simplified and streamlined, even when the data used to populate the user interfaces is stored in complex, vast schemas. For example query logic can be expressed in templates and parameters in ways that scale to large and agile engineering teams. Data can be provided to applications that require data freshness (i.e., new or recent data) that might prevent other techniques from working in all situations. For example, extract-transform-load pipelines can involve considerable complexity, and significant operational problems can occur with improperly designed systems. As another example, materialized views may not work well when queries are not often reused.

Because applications can be developed to communicate in terms of more templates and parameters that are simplistic compared to more complex SQL statements, the difficulty of software engineering tasks such as documenting, communicating, and modifying software can be reduced. The amount of code required to perform a particular action may be greatly reduced when using templates and parameters as opposed to writing SQL statements directly. Then, when used, conversions from the templates and parameters to the SQL statements may then be handled by computing devices, which can be programmed to quickly and reliably generate the large, complex SQL statements.

Other features, aspects and potential advantages will be apparent from the accompanying description and figures.

DETAILED DESCRIPTION

Distributed data stores spread data through a network of servers, clusters, or datacenters. These data stores often hold the data in schemas that are complex and read-unfriendly. Programming languages for writing queries to access this data are technically usable but are difficult to handle, design with, or manage. This document describes schemes for use of a queries in programming language that can be simple, concise, and short enough to reduce or prevent these problems.

Generally, this document describes the use of different templates for different user interfaces. As the interface changes (e.g., a user viewing a chart of data for some date range can input a request to change the date range to be shown in the chart), parameters corresponding to the change are applied to a matching template in order to create a large or complex query that is needed to pull the data out of a data store. This allows the developer of the user interface to document, code, and debug in terms of these templates and parameter, instead of in terms of larger and more unwieldy queries.

Figure 1:
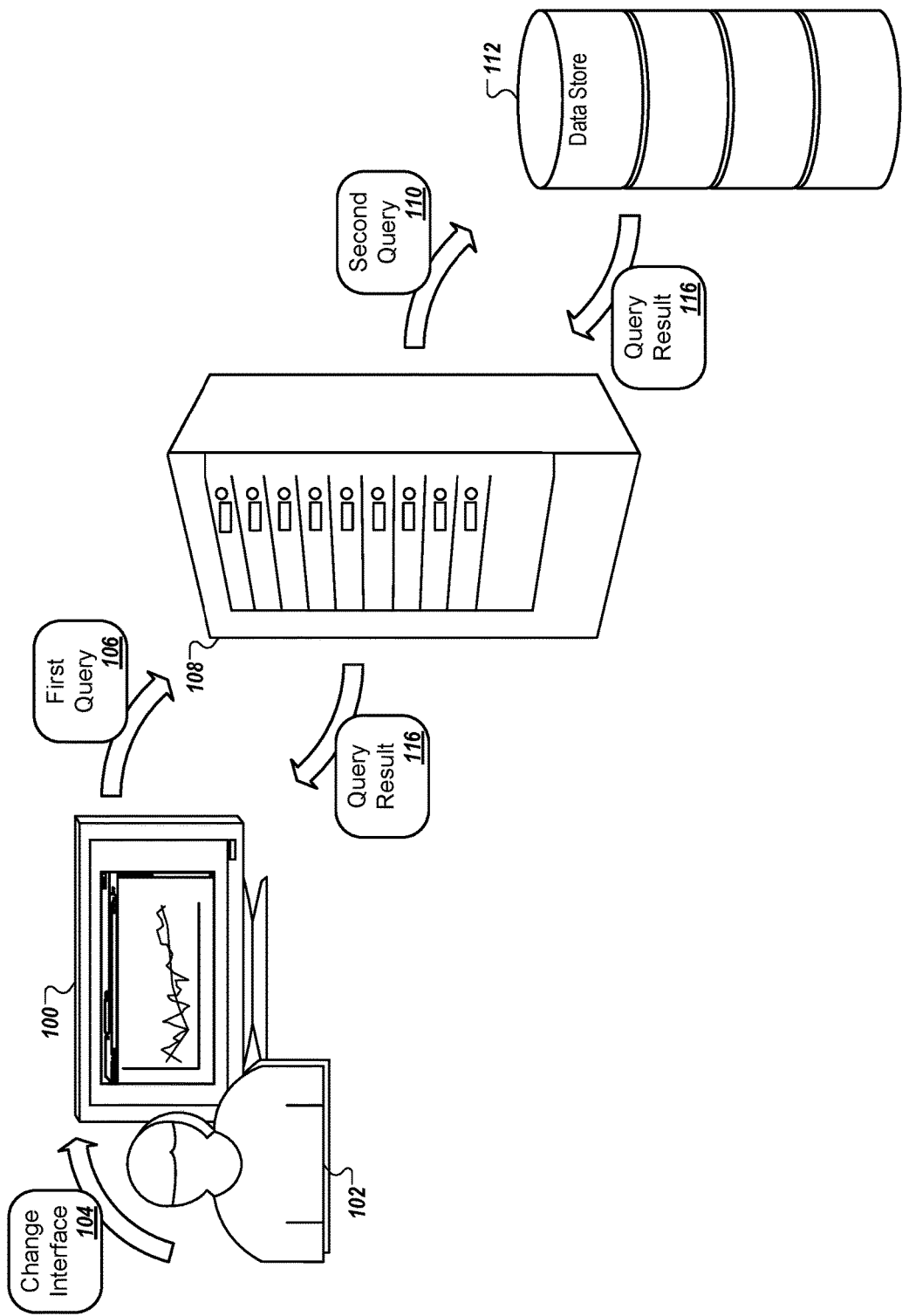
FIG. 1 is schematic diagram of data presentation on a user interface.

FIG. 1 is schematic diagram of data presentation on a user interface 100. The user interface 100 is presented to a user 102 on a display of a computing device. A change 104 to the user interface 104 can be made. For example, the user 102 can submit an input that changes 104 the user interface 100, and in response to the user input to change the user interface 100, a first query 106 can be sent to a server 108. In another example, an non-user event may cause a change 104 to the user interface 104. For example, if the user interface 100 is showing up-to-date data, the user interface 1004 may initiate a refresh every minute as a change 104.

After receiving the first query 106, the server 108 can generate the second query 110 from the first query 106 and send the second query 110 to the data store 112. The data store 116 can generate query results 116 to be passed back to the user interface 100 for presentation to the user 102.

For example, the user 102 may be using a computer to access an application that shows data from the data store 112. This example will be described in terms of a user 102 that is using an application for tracking shipments and vehicles of a logistics company. This tracking data can be collected in the data store 112 from multiple sources such as global positioning system (GPS) sensors, delivery notifications, order placement systems, etc. The application can generate the user interface 100 to show data from the data store 112 (e.g., fuel usage, number of deliveries, financial transactions). The user 102 can enter an input to change the user interface 100, for example, by submitting a new date range for the data, selecting an entry in a drop-down box that lists the available types of data that can be displayed, by navigating from one webpage to a different webpage, and/or changing to a different user interface. For example, a first user interface may be directed to global positioning system sensor information while a second user interface is directed to delivery notification information. These interfaces may be native to the application, served as webpages by a webserver, or provided in other ways.

In response, the computing device displaying the user interface 100 can begin operations to obtain the data needed to respond to the user input. The computing device displaying the user interface 100 can generate the first query 106 that is configured to specify the data needed to effectuate the change in the user interface 100. For example, if the user 102 changes the user interface 100 from a view of a particular type of data from the last two hours to a view that shows the same type of data from the last three hours, the first query 106 can request the data needed for this new three-hour view. As noted above, each user interface is associated with at least one template. When a user submits his or her input, the first query 106 can be configured to specify an associated template and parameters that are based on the user input. For example, if a user input specifies a change in numeric value (i.e., two hours to three hours), the first query 106 would specify the same template that was used before, but with new parameters (i.e., two to three). If the user changes to a different user interface (e.g., navigating to a different webpage or display within the tracking application), the first query 106 would specify a new template and new parameters.

The server 108 can receive the first query 106 and generate the second query 110 from the first query 110. For example, the server 108 can examine the first query 106 to determine which template out of a group of templates is requested. Then the server can apply parameters of the first query 106 to the selected template, which can generate the second query 110.

The server 108 can then pass the second query 110 to the data store 112. This second query 110 can be in a different programming language than the first query, and the programming language of the second query is one that the data store 112 is capable of processing. Programming languages can include, but are not limited to, query languages, scripting languages, or any other technically appropriate language for issuing commands to a database or data store. For example, the second query 110 may be in the SQL programming language, and the data store 112 may include one or more relational databases or other databases that can process a SQL query to look up and return information.

The data store 112 can collect this information, possibly collected from different databases of the data store 112, and return the information as the query result 116. The query result 116 is then routed to the interface 100 for presentation to the user. In this example, the query result 116 is sent via the server 108, but it may be sent via another path that does not include the server 108.

RVL is a programming language that can be used for the first query, and that can be compiled into SQL for the second query. Although other programming languages can be used for the first query and for the second query, the following discussion explores some features of RVL and SQL use. Some or all of these features may be the same or similar in other examples that use different programming languages. In some implementations, even some implementations with RVL and SQL, certain features may be missing or different.

RVL can help view definition authors (e.g., developers of applications on the computing device displaying the user interface 100) focus on the specifics of views and not be as concerned with the problems associated with the generation of SQL.

At the core of RVL is a self-contained query programming language. The syntax of the query programming language is similar to SQL, but with important semantic differences. RVL uses information in schema to automatically (i.e., without particular user input) aggregate data when columns are projected, which can make it easier for developers to express complex aggregation logic.

RVL embeds its query programming language in higher-level constructs called view templates. A view template specifies a dynamic query using replaceable parameters.

Within each template, a query can be built as a sequence of subquery assignment statements. Each subquery in a template may refer to template parameters and instantiate other view templates. Overall, composable templates and sequential query construction allow a view's implementation to be factored into manageable and reusable pieces RVL code is structured as a collection of view templates. In order to generate SQL, the RVL compiler, which is an example of a query compiler, uses one template to be specified as an entry point, along with parameter bindings for that template. When systems receive a query, the request handler first translates that query into parameter bindings to pass to the RVL compiler, which returns generated SQL. The request handler then executes the SQL query on the data at issue and forwards the query results back to the systems' clients.

Figure 2:
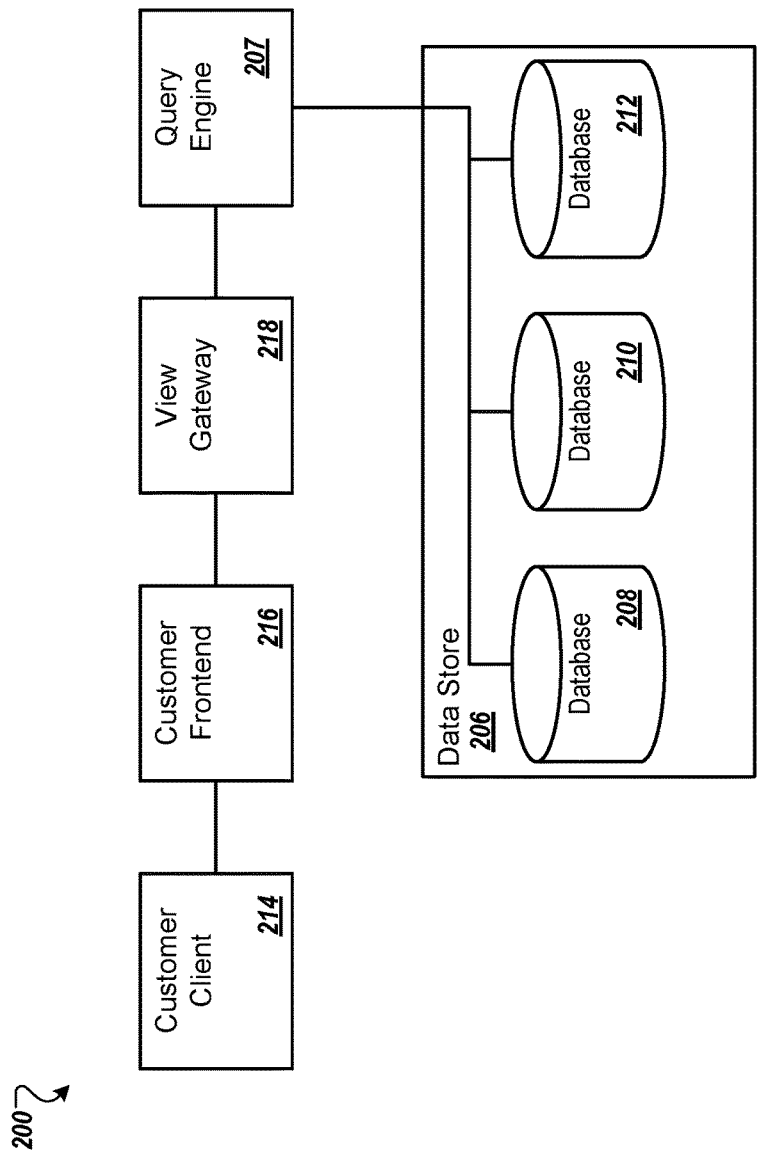
FIG. 2 is a block diagram of an example system for handling queries.

FIG. 2 is a block diagram of an example system 100 for handling queries. In the system 100, a service can generate or collect some data. In the example of a logistics tracking company, the service may include the global positioning system (GPS) sensors, delivery notifications, order placement systems, etc.

The service can send this data to a service frontend to be stored in a data store 206 for storage. The service frontend can receive this data and pass the data to data store 206. For example, the data store 206 can include, for example, a query engine 207 and multiple databases 208-212. The query engine can process queries that store, retrieve, or edit data in the data store 206. Each of the databases 208-212 can be configured to store this data, for example by each storing data in different ways. Each of the databases 208-212 may be relational or non-relational. This may allow for a diversity of storage. options. For example, the database 208 may store unstructured data a binary large objects (BLOBs), the database 210 may store structured data in tables, and the database 212 may store sensitive data under increased access logging. The query engine 207 can receive a query to store, for example, a set of data that includes BLOBs, and index of the BLOBs, and sensitive data associated with the BLOBs. The query engine 207 can then store the BLOBs in the database 208, the index in the tables of the database 210, and the sensitive data in the database 212.

In some configurations, some or all of the databases 208-212 may also or alternatively have their own query engines. For example, instead of a query engine 207 for the entire datastore 206, each database 208-212 may have their own query engine. In another example, a subset, but not all of the databases 208-212, may share one query engine while other databases 208-212 use one or more different query engines. These query engines may be internal or external to the databases 208-212.

In some configurations, some or all of the databases 208-212 may include nodes (e.g., virtual devices, servers, clusters) configured to use read-only in-memory caches. These caches may leverage spatial and temporal locality of data accessed by the customer client 214 to improve performance. These caches can access consistent snapshots of data stored in one or more of the databases 208-212 for access that is faster than retrieval from the originating database 208-212. These caches may be configured as distributed in-memory read-through caches for their data. The customer client 214 can access data in per-user sessions, which can be facilitated, for example, by using individual queries that are scoped to on specific root ID. This root ID may be a prefix of the primary key of a collection of related tables, and application users can be identified by root ID. Given a table name, root ID, and time-stamp, the cache can serve data to the query engine 207 faster and at higher throughput compared to, for example, an uncached database. In other configurations, the sessions may not be per-user sessions.

To allow for more read parallelism compared to reading from a database directly, rows of a table for a given table name and root ID can be partitioned into table shards that can be significantly smaller than shards in the associated database, for example the shards may be smaller by a factor of 2, 7, 10, or 13. A periodic offline job can store metadata in a database, mapping each table and root ID pair to a list of table shard boundary keys and size estimates. The sharding algorithm can be configured to create small yet evenly sized shards, maximizing read throughput and/or minimizing input data skew. The offline job can repeat analysis for root IDs with a significant number of recent changes, preserving data freshness in the cache.

In some cases, the data store 206 may only include, or may only be, a single database 208. In some cases, the databases 208 may have different properties such as geographic locations, costs, storage formats, latency, security, etc. In such cases, the data store 206 may store the data received from the service in the appropriate database 208-212 as determined by, for example, the service frontend 204 or the data store 206.

In the logistics company example, the service, service frontend, and data store 206 can work together to store data of the company in the data store 206. This data may then be used by the company and other parties authorized to access the data to run the company, update customers with shipping notifications, receive orders, etc.

To use this data, a customer client 214 may provide a user interface to display the data. Continuing with the logistics company example, the customer client 214 may be running an application that shows a user the status of a number of shipments that are in transit. To populate the information for this application, the customer client 214 may, for example, send to a customer frontend 216 a request for the current status of all shipments to a particular customer's home address. The customer frontend 216 can verify that the user of the customer client 214 is authorized to receive this information and may generate a first query in a first programming language to request this information from the data store 206. This first query can be generated to include a template identifier for a template that corresponds to the user interface that is shown to the user and may also include first parameters such as a customer ID, a shipping address, and/or a parameter specifying the current versus historical status of shipments.

The customer frontend 216 can receive this first query from the customer frontend 216 and compile the first query and the corresponding template into a second query in a second, different programming language than the first query. The customer frontend 216 can then send the second query to the view gateway 218. This second query may be generated in a programming language and in a format that the data store 206 can process. For example, the data store 206 may process the query and pull parts of the query result from one or more of the databases 208-212. Alternatively, the data store 206 may send the second query, or portions of the second query, to one or more of the databases 208-212. The receiving databases 208-212 may then process the query or query portions to generate the query result.

The query result may then be sent to the customer client 214. For example, the data store 206 may send the query result to the view gateway 218. The view gateway 218 may then pass the query results to the customer frontend 216, which can then pass the query results to the customer client 214. In some implementations, the query results may be modified or supplemented by the view gateway 218 and/or the customer frontend 216. The customer client 214 may then populate the user interface for the user, showing the user the status of their his or her shipments.

The system 100 includes computer components such as hardware and/or software that is connected via data networks such as the internet. A single component may include multiple software applications or object and may be executed on a single computer device or spread over multiple computer devices. Similarly, a single computing device may host more than one of the components of the system 100. For example, a single application running on a single computer device may be both the service and the customer client 214.

Figure 3:
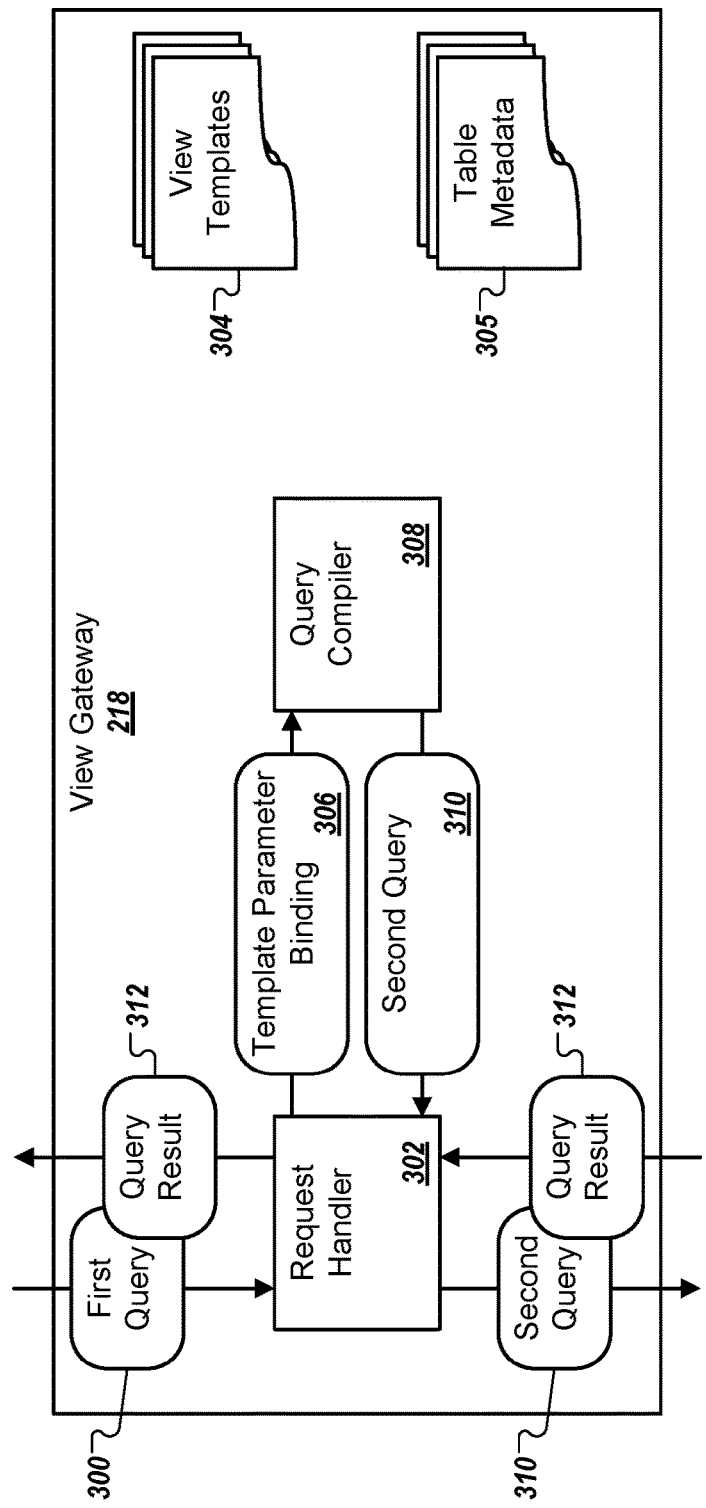
FIG. 3 is a block diagram of an example system for compiling queries.

FIG. 3 is a block diagram of an example system for compiling queries. In this example, a possible configuration of the view gateway 218 is discussed. However, other configurations are possible.

The view gateway 218 receives a first query 300 at a request handler 302. For example, the first query may be received from a client such as the customer client 214. The first query may be in a first programming language and include a first set of parameters and a template identifier. The request handler 302 can select a selected template out of the view templates 304 based on the template identifier matching a property of the selected template. For example, if the first query 300 includes a template name, the request handler 302 can select a template with that name. If the first query 300 includes an author identifier and a data size, the request handler 302 can select a template that has the corresponding author signature and data size.

The request handler 302 then binds the parameters of the first query 300 to the selected template to form template parameter bindings 306 and sends the template parameter bindings 306 to a query compiler 308. In general, binding parameters to a template includes populating or associating values to sections of a template that are placeholders for values. By binding values to a template, variables of the template may be given values that, for example, are not known at the time the template is developed.

The query compiler 308 is configured to use the template parameter bindings 306 and table metadata 305 to compile the first query 300 into a second query 310 in a second programming language, different than the first programming language. For example, the selected template may include commands and statements that have empty fields. These empty fields may be populated by the query compiler 308 with parameters of the first query 300 or with data derived from the parameters of the first query 300. Data derived from a parameter may include, for example, a current date stamp if the parameters include a "current time" parameter. The table metadata 305 includes information about tables, or other data structures, within the data store 206. The query compiler 308 can use the table metadata 305 to explicitly describe, in the second query 310, aggregation functions that are implicitly described in the first query 300, as will be discussed with more detail below.

The request handler 302 can receive the second query 310 from the query compiler 308 and send the second query 310 to a data store such as the data store 206 for processing. The data store 206 may process or have processed the second query 310 and pass resulting query results 312 to the request handler 302 for return to the client. The query results 312 can be aggregated according to the aggregation function or functions that were implicitly described in the first query 300 and then explicitly described in the second query 310. Aggregation functions include functions that group multiple values together. For example, an aggregation function on data in a table may specify how rows of the table should be combined. Example combinations include, but are not limited to, summations, averages, and counts.

Figure 4:
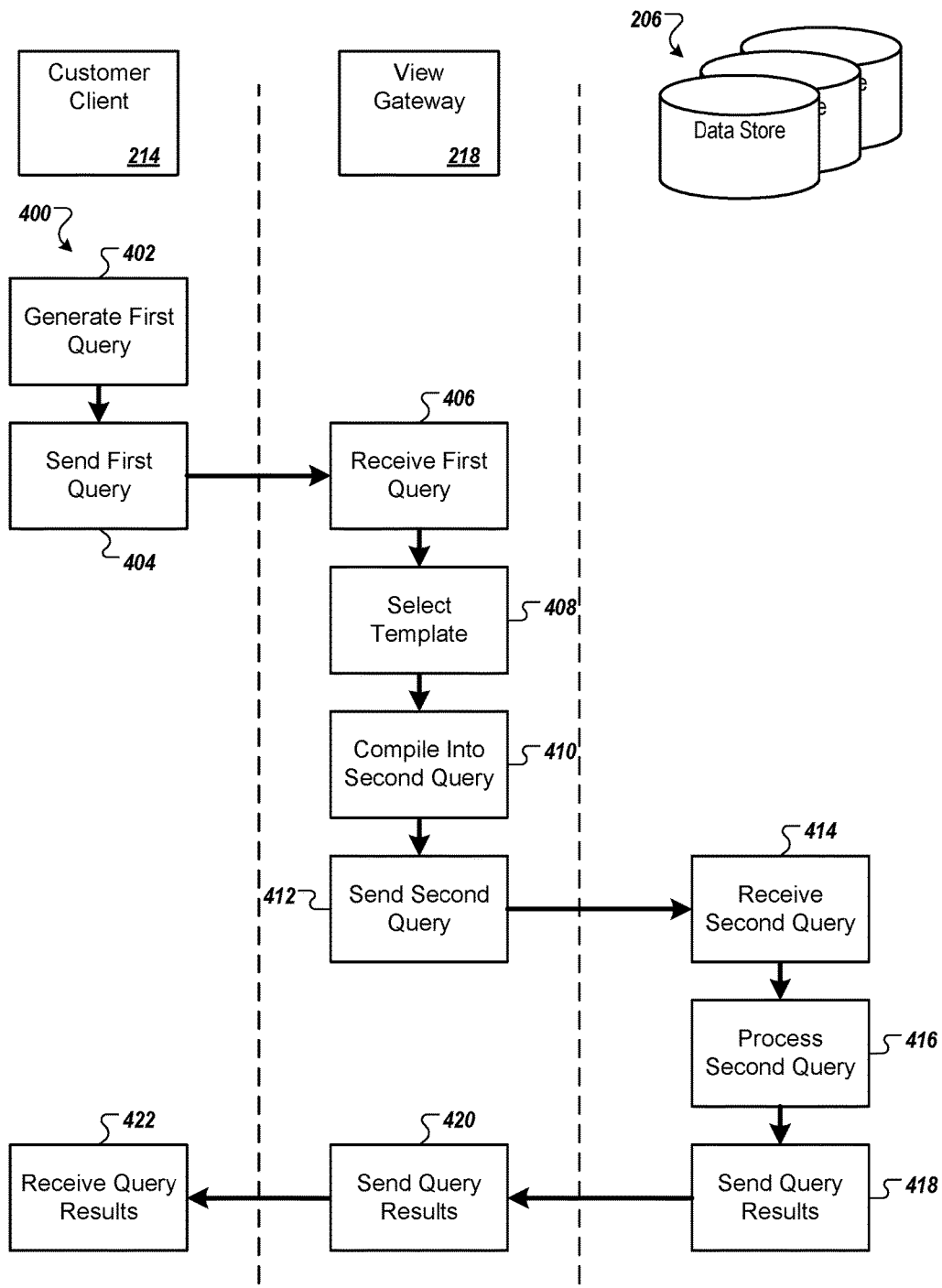
FIG. 4 is a swim-lane diagram of an example process for handling queries.

FIG. 4 is a swim-lane diagram of an example process 400 for handling queries. For clarity of description, the process 400 will be described with reference to some of the elements of the system 200. However, elements could be used to perform the process 400 or a similar process.

A first query is generated at 402. For example, the customer client 214 can present, to a user, a plurality of user interfaces. These user interfaces may be presented contemporaneously, or at different times. This may include, for example, different tabs in an application, or a single presentation with different interfaces on different parts of a screen.

Each user interface can be associated with at least one template of a plurality of templates. For example, the developers that have created the user interfaces may have also created one or more templates for the user interfaces. The templates can include computer code used to request data for the user interface, as well as empty fields to be filled in by, for example, a view gateway, when the template is used to generate a query to request data from a data store.

The customer client 214 can receive, from the user, input to a particular user interface and generate first parameters based on receiving the input. For example, if a user selects a type of data, a date range, a tracking number, a purchase order, an advertisement, or any other appropriate data, the customer client 214 can create first parameters to represent the user's selection.

The customer client 214 can determine that a particular user interface is associated with the selected template and send a first query to the view gateway responsive to determining that the particular user interface is associated with the selected template. The first query can include the first parameters and a template identifier. For example the user interface may be associated with a single template. In another example, the user interface may be associated with a number of possible templates, contingent on user input or other appropriate factors.

The first query is sent at 404 and is received at 406. For example, the customer client 214 can be configured to send the first query to the view gateway 218, and the view gateway 218 can be configured to receive the first query.

A template is selected at 408. For example, the view gateway 218 can be configured to select a template from a plurality of templates based on the template identifier. To do so, the view gateway 218 may examine the template identifier and select a template with a matching name or a template that complies with a logical test using the template identifier.

Each of the templates can include a sequence of subquery assignment statements that assign a data variable of the template to the value of a parameter of one of the group consisting of i) a parameter of a query and ii) a parameter of a template. For example, each template may include assignment statements such as assigning a variable to value created by a parameter of a query or template or to a value created by calling a function, including Join functions that use a parameter of a query or of a template as an argument.

As such, the templates may be configured such that one template in the plurality of templates is an entry point that specifies a beginning of execution, and wherein all other templates are dependent from the entry point. That is, one of the templates may be configured such that all other templates used in subquery assignment statements of other templates. This may be useful, for example, in order to provide a single public interface that can be used by all external calls to the templates. Other templates may then by configured as private implementation details. Thus, changes may be made to any of these templates without needing to update documentation or the external calls.

The first query is compiled into a second query at 410. For example, the view gateway 218 can be configured to compile the first query and the selected template into a second query in a second programming language. In one example, the first query may be in a programming language called Relational View Programming language (RVL) and the second query may be in the SQL programming language. In this example, RVL and SQL may share syntactic elements, but are nevertheless different programming languages. For example, while RVL may be described as an abstraction of SQL and while RVL's syntax may be a subset of SQL, RVL is considered to be a different language than SQL. As only example difference, RVL includes templating and parameterization that are not present in SQL. Other differences between these two languages may also exist. In other cases, programming languages that are more similar to each other than RVL and SQL or programming languages that are less similar to each other may be used as the first and second programming languages.

The second query can include second parameters generated based on the first parameters and on the selected template. These second parameters may be generated by, for example, binding the first parameters to the selected template. Generally, this may be thought of as filling in placeholder fields of the template with the first parameters to create the second parameters.

A request handler of the view gateway 218 can be configured to select the template from the plurality of templates based on the template identifier matching a property of the selected template. A query compiler of the view gateway 218 can be configured to generate the second query from the first parameter and the selected template after the request handler selects the template. In other examples, a view gateway may have only request handler and no query compiler, or may have only a query compiler and no request handler, or view gateways may be configured without either.

The first query need not identify an aggregation of the query results, for example by an aggregation function. To compile the first query and the selected template into the second query in the second programming language, the view gateway 218 can be configured to determine an aggregation of the query results to be specified in the second query, as will be discussed in greater detail below.

The second query is sent at 412 and is received at 414. The view gateway 218 can be configured to send the second query to the data store 206 for processing, and the data store 206 can be configured to receive the second query from the view gateway 218.

The second query is processed at 416. The data store 206 can be configured to process the second query. For example, the data store 206 can process some or all of the second query, pass some or all of the second query to databases, or otherwise delegate the processing of the second query in order to generate query results.

Query results are sent at 418 and at 420, and query results are received at 4226. For example, the data store 206 can be configured to send a query result that is responsive to the second query to the view gateway 218. The view gateway 218 can be configured to receive a query result and send the query result to the customer client 214. The customer client 214 can be configured to receive the query results from the view gateway and then display the query results to a user, for example.

RVL includes a query programming language to specify data transformations. The syntax and semantics are similar to SQL, with at least one difference: RVL automatically determines how to aggregate query results. As shown in examples below, automatic aggregation can help simplify the specification of view queries for reporting applications built on systems. To take advantage of automatic aggregation, the metadata of each column may optionally specify an implicit aggregation function. If a column has an implicit aggregation function, that column can be referred to as an aggregatable column. Otherwise, it can be referred to as a grouping column. When a query operation is performed in RVL, the result will preserve the unique values of the grouping columns, and the aggregatable columns are implicitly aggregated for each row based on the associated aggregation function. In other words, the grouping columns form a unique key for a relation in RVL, and the aggregatable columns represent measures associated with values of the unique key. In the special case where all columns are grouping columns, the behavior of RVL is consistent with relational algebra on sets. In practice, systems applications specify implicit aggregation functions as overlays on an existing database schema and include this information in the table metadata given to the RVL compiler. RVL also supports syntax to modify or remove implicit aggregation functions assigned to the columns of a relation.

RVL queries may use several syntactic constructs from SQL such as SELECT, FROM, WHERE, JOIN, and UNION. The behavior of these operations is similar to SQL, except that implicit aggregation is applied after each operation to yield a set of unique rows. There is no GROUP BY clause in RVL in some configurations, because aggregation can be implicit for each SELECT. RVL also makes extensions to SQL in order to help with large-scale code maintenance. The following can illustrate the behavior of RVL queries on the following two tables representing information about employees and buildings of a company:

| Employee table: | | | |
|---|---|---|---|
| EmpId | DeptId | BldgId | Salary |SUM| |
| I | A | X | 20 |
| J | A | X | 30 |
| K | B | Y | 40 |
| L | B | Z | 50 |

| Building Table | | |
|---|---|---|
| BldgId | CityId | Capacity |SUM| |
| X | M | 100 |
| Y | N | 200 |
| Z | N | 300 |

The columns for salary and capacity have the [SUM] annotation to indicate that they use SUM as their implicit aggregation function.

An application may need to derive the total salary or capacity for a variety of grouping columns. Using RVL, the example can start by combining the tables with a left join, and let Q0 denote this subquery:

Q0=SELECT*FROM Employee LEFT JOIN Building USING (BldgId);

This provides a list of employees and information about their building, if known. The example may use this subquery to write a very simple query for the total salary in each department:

Q1=SELECT DeptId, Salary FROM Q0;

Evaluating Q1 will return the unique DeptId values and automatically compute the sum of salaries in each department, yielding the final result:

| DeptID | Salary |SUM| | Capacity |SUM| |
|---|---|---|
| A | 50 | 100 |
| B | 90 | 500 |

This could be expressed in SQL using an explicit SUM and GROUP BY clause:

SELECT DeptId, SUM(Salary) FROM Employee GROUP BY DeptId;

The RVL compiler will actually generate this SQL for Q1. The join with the Building table can be pruned because none of the Building columns are required. Join pruning is a feature of RVL, which the example will discuss below.

Implicit aggregation is illustrated where data is requested from both tables. For example:

Q2=SELECT CityId, Salary, Capacity FROM Q0;

This will return the unique CityID values and automatically compute the total salaries of employees in each city, along with the capacity of the buildings in that city:

| CityID | Salary |SUM| | Capacity |SUM| |
|---|---|---|
| M | 20 | 100 |
| N | 120 | 500 |

The RVL compiler generates the following SQL representation of Q2 which adds two GROUP BY steps:

SELECT CityId, SUM(Salary) AS Salary, SUM(Capacity) AS Capacity FROM (SELECT BldgId, SUM(Salary) AS Salary FROM Employee GROUP BY BldgId) LEFT JOIN Building USING (BldgId)) GROUP BY CityId;

The inner subquery removes EmpId and DeptId, in order to aggregate the remaining columns of the Employee table before the join. The inner aggregation ensures that the capacity is computed correctly. If the example naively removed all unwanted columns after the join and performed the aggregation in a single step, the capacity values would be multiplied by the number of employees in each building. Desired result should only count the capacity of each building once.

In RVL, the example can define a single subquery Q0 such that Q1 and Q2 can be expressed as simple projections over Q0. In contrast, the SQL representations of Q1 and Q2 have different structure. RVL also makes it easy to derive meaningful aggregate values from Q0 for many other combinations of grouping columns. A direct SQL representation of all possible projections over the join would need to account for all the potential arrangements of GROUP BY clauses and invocations of aggregation functions. In practice, real systems queries can be more complex, requiring dozens of tables to be joined. It becomes challenging for developers to formulate the correct aggregation semantics using SQL directly whereas formulating queries using RVL makes it much more simple and intuitive.

The RVL query programming language provides implicit aggregation to help developers express aggregation semantics when the set of requested columns is not fixed. However, implicit aggregation does not solve all the challenges of implementing views.

The parameters of a view may have a large impact on the RVL query. For instance, the view parameters may change the tables used in joins or the placement of filters in the query. RVL needs to be more dynamic in order to capture this wide range of possible query structures.

An RVL query could grow quite large with many column transformations and deeply nested joins. A typical view would require hundreds of lines of code, and expressing that as a single large query can be difficult to read and maintain.

RVL view templates can prevent or reduce these problems. View templates allow large queries to be constructed dynamically from smaller pieces, which can be composed and reused by multiple views. A view template takes input parameters which are used to represent the dynamic aspects of a query (e.g., list of requested columns) and returns a corresponding RVL query using the parameter values. In other words, for any fixed choice of parameter values, a view template is shorthand for an RVL query (similar to the traditional notion of a view).

A view template may be referenced in the FROM clause of RVL queries by passing values for its input parameters, and the reference will be replaced with the query generated by the view template. The following values may be bound to view template parameters:

RVL text: A string containing valid RVL syntax can be bound to a view template parameter, and that parameter can be referenced in places where it would be valid to inject the RVL syntax string. For example, a template parameter bound to the string "X,Y" could be referenced in a SELECT clause, and the template parameter reference will behave exactly as if "X,Y" were written directly in the query.

A template parameter can be bound to a dictionary of name-value pairs, where the values can either be another dictionary, or RVL text. Intuitively, a nested dictionary is a collection of RVL text parameters with hierarchical names.

A template parameter can be bound to an RVL subquery and referenced anywhere a table can be referenced. A subquery value differs from RVL text values, in the sense that subquery values are substituted in a purely logical manner which is independent of the syntax used to create the subquery. In contrast, an RVL text value is purely a text injection, which allows any variables in the RVL text to be interpreted based on the context where the parameter is referenced.

RVL text values allow RVL parameters to be more flexible than traditional SQL runtime parameters because RVL allows parameters to represent large substructures of queries. However, RVL text values do not allow for arbitrary code injection. In order to make view templates less error-prone, an RVL text value may only be allowed to contain a few specific syntactic forms, such as scalar expressions, expression lists, and base table names. There may also be strict rules controlling the locations where each syntactic form can be substituted.

The example use the following example to illustrate the basic template syntax and semantics:

view FilterUnion<input_table, params> {T1=SELECT $params.column_name FROM $input_table; T2=SELECT $params.column_name FROM Employee; T=T1 UNION T2; return SELECT*FROM T WHERE $params.column_name>=$params.min_value;}

The view template contains three assignment statements which give aliases to subqueries, and the fourth statement returns the final query. There are two template parameters:

input_table can be bound to a table name or subquery. It is referenced in the first FROM clause as $input_table.

params must be bound to a nested dictionary. In this example, $params.column_name should be the name of a column in $input_table, and $params.min_value is a lower bound that the example want to apply to that column.

The first two statements fetch a dynamically chosen column from the $input_table parameter as well as the Employee table, the third statement combines the two sets of values, and the final statement applies a lower bound to the values before returning them.

A view template can be designated as an entry point in the RVL code, in which case it is called a main view template. RVL provides an API to invoke a main view template, with a nested dictionary as a parameter. The main view template can use one or more output statements to specify the desired result. For example, using the previous FilterUnion view template:

main OutputValues<params> {b=SELECT*FROM Building; all_values=SELECT*from FilterUnion<@b, $params>; output all_values AS result;}

The output statement specifies a table to produce as the final result when the main view template is invoked, as well as an alias for that table. If there are multiple output statements, the aliases must be unique so that the view gateway can distinguish the results. Multiple output statements can reference the same RVL subquery by name, which is useful when applications need to display multiple pivots of the same shared view computation. To achieve consistency between different data pivots within a view query, RVL guarantees that each named subquery is only executed once.

RVL view templates may use control structures written as if/else blocks to dynamically choose between two or more subqueries.

The RVL compiler generates SQL, which will produce the output tables specified by a main view template, given the required parameter bindings. The system executes the generated SQL using the data store's query engine, taking advantage of data store's query optimizations and distributed execution. In order to perform SQL generation, the RVL compiler first resolves references to view templates and named subqueries, producing an algebraic representation of an RVL query plan that includes all outputs of the invoked main view template. The RVL compiler performs some transformations to optimize and simplify the query plan before translating it to SQL. In this section, the example describe some details of RVL query optimization and explain why it is important.

The RVL compiler optimizes query plans using a rule-based engine. Each rule uses a different strategy to simplify the plan based on algebraic structure, without estimating cost. In practice, rule-based optimization is sufficient because the goal is to simplify the generated SQL, rather than determine all details of query execution. The example avoids using cost-based optimization because a cost model would tie the RVL compiler to a specific SQL engine and make it less generic.

The intuitive reason to optimize an RVL query plan before generating SQL (as opposed to relying on the data store for all optimizations) is to take advantage of RVL's implicit aggregation semantics. Optimization rules can be implemented in the RVL compiler relying on properties of implicit aggregation to ensure correctness. The RVL compiler can also implement optimization rules that do not depend directly on implicit aggregation because they interact with other rules that do depend on implicit aggregation and make them more effective. The example describe several rules below.

With reference to the example above that discussed employees and buildings of a company, SQL representation of Q2 performed a projection and aggregation before the join, which differs from the order of operations in the RVL for Q2. The join and aggregation steps are reordered by an RVL optimization rule called column pruning. Without column pruning, the equivalent SQL representation of Q2 would be:

SELECT CityId, SUM(Salary) AS Salary, SUM(Capacity) AS Capacity FROM (SELECT BldgId, CityId, SUM(Salary) AS Salary, Capacity FROM Employee LEFT JOIN Building USING (BldgId) GROUP BY BldgId, CityId, Capacity) GROUP BY CityId;

This SQL representation performs two stages of aggregation after the join, in order to compute correct aggregate values for both salary and capacity. This query may be a difficult optimization to generalize in the context of SQL. For larger RVL queries, the SQL representation may become much more complicated when computing aggregate values after joining. In the worst case, an implicit aggregation may require aggregatable columns to be computed in a temporary table and joined back into the original query. That pattern in particular is extremely difficult for a SQL engine to optimize, so column pruning is possible in order to simplify the task of the data store's query optimizer. Moreover, the logic for pruning columns in the RVL compiler is straightforward due to implicit aggregation semantics. For all these reasons, the RVL compiler aggressively prunes unneeded columns and performs aggregations before joins whenever possible.

In a SQL database, filter pushdown may be used for optimization, where the goal is to filter data as early as possible in the query plan. It might seem unnecessary for RVL to push down filters, as the data store query optimizer can perform this optimization. However, filter pushdown can improve the effectiveness of the column pruning optimization. For example, if there is a filter on a column that is not part of the final result, the filter may prevent column pruning from removing the column before the filter is applied. It is helpful for the filter to be pushed down as early as possible in the query plan, so that the column can be pruned early as well.

In RVL, if a left join does not require any of the columns from its right input, the right input can be removed from the query plan. In a general SQL database, this optimization may be less obvious and less likely to apply, as a left join may duplicate rows in the left input. The following example shows a SQL left join, using the example Employee and Building tables above:

SELECT EmpId, SUM(Salary) FROM Employee LEFT JOIN Building USING (BldgId);

If it is known that each Employee row will join with at most one row in the Building table, the join can be pruned, resulting in:

SELECT EmpId, SUM(Salary) FROM Employee;

A SQL optimizer might be able to perform this optimization if it knows that BldgId is a unique key of the Building table. The optimization would become more difficult to do if the Building table were replaced with a complex subquery. On the other hand, the left join in RVL is possible to prune, because the inputs of the join are always guaranteed to be sets, and the column pruning optimization will prune all Building columns except BldgId.

The join pruning optimization makes RVL programming more convenient. A user can add many left joins to their view templates to fetch columns which might not be required, and they can be confident that the RVL compiler will know which joins can be skipped.

Below is shown example schemas for data store tables. The example uses the data store dimension tables Customer, Campaign, Budget, BudgetSuggestionV1, and BudgetSuggestionV2, using CustomerId as the root ID BudgetSuggestionV1 and BudgetSuggestionV2 tables capture a case in which an application is migrating from an older to a newer, higher quality representation of budget suggestions. The application may want to use the new suggestions for only a small whitelist of advertisers initially and ramp up slowly to all customers. The example therefore maintains both versions during the transition period. As different teams use the respective backend pipelines, separate tables help clarify ownership.

Customer(root table)

| CustomerId | CustomerInfo |
|---|---|
| 20 | { name: "flowers" } |

BudgetSuggestionVI

| CustomerId | BudgetId | SuggestionInfo |
|---|---|---|
| 20 | 200 | { suggested_amount: 120 } |

Campaign

| CustomerId | CampaignId | CampaignInfo |
|---|---|---|
| 20 | 100 | { name: "Rose" status: "ENABLED" budget_id: 200 } |
| 20 | 101 | { name: "Tulip" status: "ENABLED" budget_id: 200 } |
| 20 | 102 | { name: "Daisy" status: "ENABLED" budget_id: 201 } |

Budget

| CustomerId | BudgetId | BudgetInfo |
|---|---|---|
| 20 | 200 | { amount: 100 } |
| 20 | 201 | { amount: 50 } |

CampaignStats

| CustomerId | CampaignId | Device | Impressions | Clicks | Cost |
|---|---|---|---|---|---|
| 20 | 100 | 'Desktop' | 20 | 5 | 3 |
| 20 | 100 | 'Tablet' | 10 | 3 | 1 |
| 20 | 101 | 'Mobile' | 30 | 4 | 2 |
| 20 | 102 | 'Desktop' | 40 | 10 | 5 |

The example also uses data store fact tables CampaignStats and CampaignConversionStats. Impressions, Clicks, Cost, and Conversions columns use SUM for implicit aggregation. CampaignConversionStats is a separate table because conversions can be broken down by the additional dimension ConversionType.

Abstracting over the complex storage schema, the system exposes a flat denormalized view CampaignReport. The view schema exposes the following columns: CustomerId, CampaignId, Name, Status, BudgetAmount, Device, Impressions, ClickThroughRate, Clicks, and Conversions. RVL code for CampaignReport is shown below.

The CampaignDimensions view template performs a join of the data store tables. The input parameter use_budget_suggestion_v2 indicates which version of budget suggestion to use. The Status column is computed with a user-defined function (UDF).

The CampaignFacts view template performs a join of data store tables. ClickThroughRate is made explicitly aggregatable by a user-defined aggregation function (UDAF) RateAgg. No explicit GROUP BY is specified, as the RVL compiler generates the correct GROUP BY clauses based on the request context.

The CampaignDimensions view template performs a join of the data store tables. The input parameter use_budget_suggestion_v2 indicates which version of budget suggestion to use. The Status column is computed with a user-defined function (UDF).

The CampaignFacts view template performs a join of data store tables. ClickThroughRate is made explicitly aggregatable by a user-defined aggregation function (UDAF) RateAgg. No explicit GROUP BY is specified, as the RVL compiler generates the correct GROUP BY clauses based on the request context.

The main view template CampaignReport joins data from CampaignDimensions and CampaignFacts. The two view outputs top_k_table and summary share the campaign_report subquery, ensuring consistency of the two data pivots.

params.filters typically contains a filter on CustomerId, but it can also contain filters on aggregatable columns like Impressions. The RVL code filters the data after projecting the final columns, but the RVL compiler may move filters to be applied earlier when possible.

The code below illustrates the flow of a sample query with (i) a specific query issued by a client against the "CampaignReport" view, (ii) RVL template parameters generated from the query by the view gateway, and (iii) the query result. The result contains only two campaigns because of the "limit: 2" clause in the query, while the summary row contains aggregate stats for all campaigns.

```
view CampaignDimensions<params>
{campaign=SELECT*, CampaignInfo.name AS Name,
CampaignInfo.budget_id AS BudgetId FROM Campaign;
  budgets=SELECT*, BudgetInfo.amount AS BudgetAmount FROM Budget;
  budget_suggestion_table=if ($params.use_budget_suggestion_v2) {BudgetSuggestionV2;} else {BudgetSuggestionV1;}
  budgets_with_suggestion=SELECT*FROM budgets LEFT JOIN budget_suggestion_table USING CustomerId, BudgetId; return SELECT*, ComputeCampaignStatus (CampaignInfo, BudgetInfo, BudgetSuggestionInfo) AS Status FROM campaign LEFT JOIN budgets_with_suggestion USING CustomerId, BudgetId;}
  view CampaignFacts<params> {return SELECT*, MakePair(Impressions, Clicks) AS ClickThroughRate [aggregation=RateAgg" ] FROM CampaignStats FULL JOIN CampaignConversionStats}
  main CampaignReport<params>
{campaign_report=SELECT $params.main_table_columns
```

FROM CampaignDimensions<$params> LEFT JOIN CampaignFacts<$params> USING CustomerId, CampaignId; output SELECT*FROM campaign_report WHERE $params.filters ORDER BY $params.order_by_columns LIMIT $params.limit as top_k_table; output SELECT $params.summary_columns FROM campaign_report as summary;}

Figure 5:
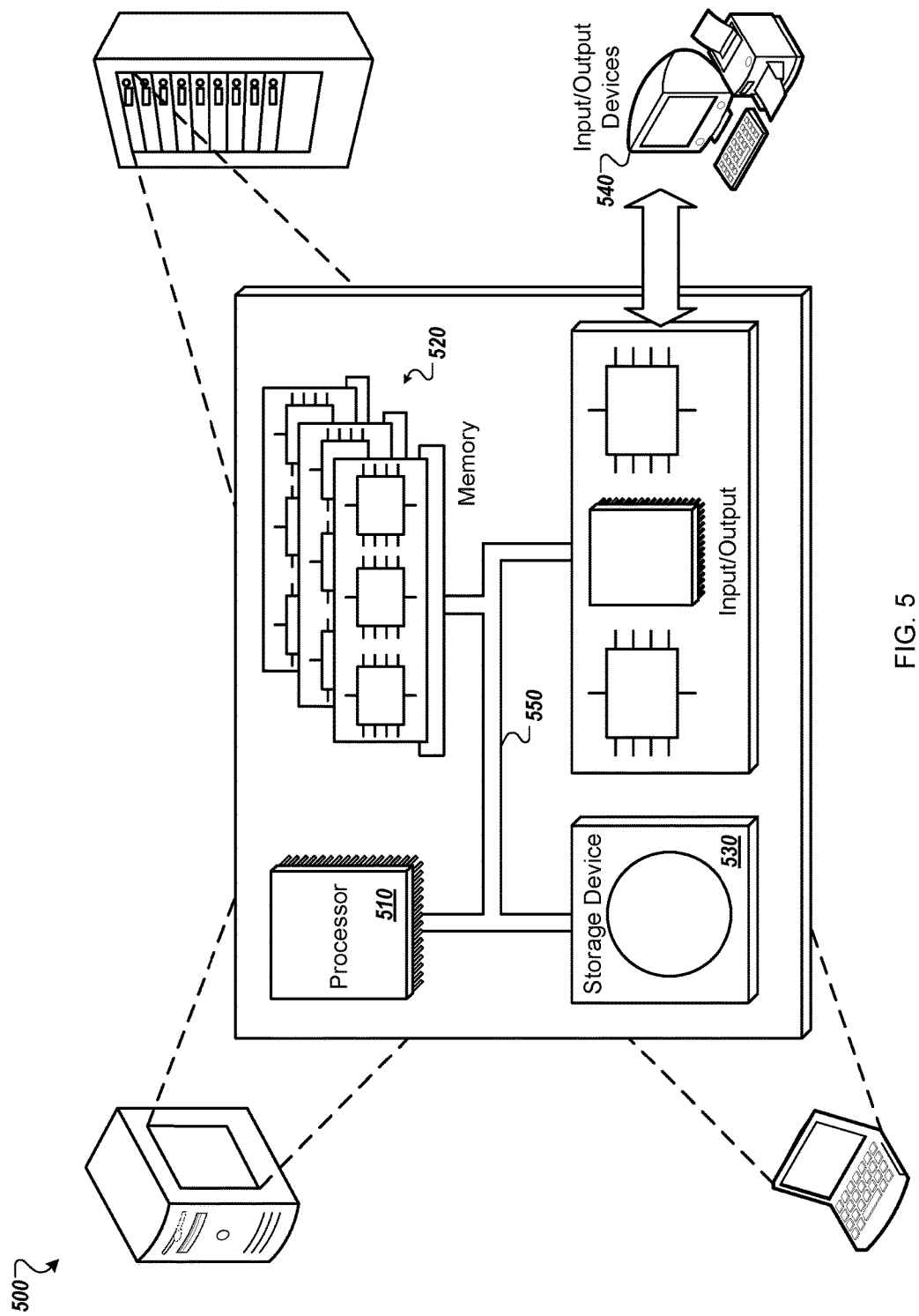
FIG. 5 is a schematic diagram that shows an example of a computing device and a mobile computing device.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming programming language, including compiled or interpreted programming languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system comprising:
a server, including one or more processors, configured to:
receive, as a result of a change to a user interface, a first query in a first programming language that embeds a view template specifying the first query as a dynamic query with replaceable parameters from a client that displays the user interface, the first query including first parameters and a template identifier, wherein the replaceable parameters of the first query are the first parameters;
select a template from a plurality of templates based on the template identifier;
compile the first query and the selected template into a second query in a second, different programming language, the second query including second parameters generated based on the first parameters and on the selected template;
send the second query to a data store for processing;
receive a query result that is (i) responsive to the second query, (ii) in the first programming language that embeds a view template specifying the second query as a dynamic query with replaceable parameters, wherein the replaceable parameters of the second query are the second parameters, and (iii) when executed, causes a visual change in the user interface; and send the query result in the first programming language to the client.

2. The system of claim 1, wherein the server comprises:
a request handler configured to select the selected template from the plurality of templates based on the template identifier matching a property of the selected template; and
a query compiler configured to generate the second query from the first parameter and the selected template after the request handler selects the selected template; and wherein
the client is configured to:
send the first query to the server;
receive the query result from the server; and
execute the query result; and
the data store is configured to:
receive the second query from the server;
process the second query; and
send the query result to the server.

3. The system of claim 1, wherein each of the templates comprise a sequence of subquery assignment statements that assign a data variable of the template to the value of a parameter of one of the group consisting of i) a parameter of a query and ii) a parameter of a template.

4. The system of claim 3, wherein one template in the plurality of templates is an entry point that specifies a beginning of execution, and wherein all other templates are dependent from the entry point.

5. The system of claim 1, wherein:
the first query does not identify an aggregation of the query results; and
to compile the first query and the selected template into the second query in the second programming language, the server is configured to determine an aggregation of the query results.

6. The system of claim 5, wherein to determine the aggregation of the query results, the server is configured to automatically identifying grouping columns in the query results such that rows having the same key values in the grouping columns are to be aggregated.

7. The system of claim 2, wherein the client is configured to:
present, to a user, a plurality of user interfaces, each user interface being associated with a template of the plurality of templates;
receive, from the user, input to a particular user interfaces;
generate the first parameters based on receiving the input;
determine that the particular user interface is associated with the selected template; and
send the first query to the server responsive to determining that the particular user interface is associated with the selected template.

8. The system of claim 1, wherein the system comprises:
a query engine; and
a plurality of databases;
wherein the query engine is configured by process the second query based on data stored in at least some of the plurality of databases.

9. The system of claim 8, wherein a particular database comprises a plurality of shards created from rows of a table of the particular database, wherein each row is associated with the client; and
wherein the particular database is configured to use the plurality of shards to cache data of the particular database.

10. A computer storage media tangibly encoded with computer program instructions that, when executed by one or more processors, cause a computer device to perform operations comprising:
receiving, by a server and as a result of a change to a user interface, a first query in a first programming language that embeds a view template specifying the first query as a dynamic query with replaceable parameters from a client that displays the user interface, the first query including first parameters and a template identifier, wherein the replaceable parameters of the first query are the first parameters;
selecting, by the server, a template from a plurality of templates based on the template identifier;
compiling, by the server, the first query and the selected template into a second query in a second, different programming language, the second query including second parameters generated based on the first parameters and on the selected template;
sending, by the server, the second query to a data store for processing;
receiving, by the server, a query result that is (i) responsive to the second query, (ii) in the first programming language that embeds a view template specifying the second query as a dynamic query with replaceable parameters, wherein the replaceable parameters of the second query are the second parameters, and (iii) when executed, causes a visual change in the user interface; and
sending, by the server, the query result in the first programming language to the client.

11. The computer storage media of claim 10, wherein the server comprises:
a request handler configured to select the selected template from the plurality of templates based on the template identifier matching a property of the selected template; and
a query compiler configured to generate the second query from the first parameter and the selected template after the request handler selects the selected template.

12. The computer storage media of claim 10, wherein each of the templates comprise a sequence of subquery assignment statements that assign a data variable of the template to the value of a parameter of one of the group consisting of i) a parameter of a query and ii) a parameter of a template.

13. The computer storage media of claim 12, wherein one template in the plurality of templates is an entry point that specifies a beginning of execution, and wherein all other templates are dependent from the entry point.

14. The computer storage media of claim 10, wherein:
the first query does not identify an aggregation of the query results; and
wherein compiling the first query and the selected template into the second query in the second programming language comprises determining an aggregation of the query results.

15. The computer storage media of claim 14, wherein to determining the aggregation of the query results comprises automatically identifying grouping columns in the query results such that rows having the same key values in the grouping columns are to be aggregated.

16. The computer storage media of claim 10, wherein the client is configured to:
    present, to a user, a plurality of user interfaces, each user interface being associated with a template of the plurality of templates;
    receive, from the user, input to a particular user interfaces;
    generate the first parameters based on receiving the input;
    determine that the particular user interface is associated with the selected template; and
    send the first query to the server responsive to determining that the particular user interface is associated with the selected template.

17. A method performed by data processing apparatuses, the method comprising:
    receiving, by a server and as a result of a change to a user interface, a first query in a first programming language that embeds a view template specifying the first query as a dynamic query with replaceable parameters from a client that displays the user interface, the first query including first parameters and a template identifier, wherein the replaceable parameters of the first query are the first parameters;
    selecting, by the server, a template from a plurality of templates based on the template identifier;
    compiling, by the server, the first query and the selected template into a second query in a second, different programming language, the second query including second parameters generated based on the first parameters and on the selected template;
    sending, by the server, the second query to a data store for processing;
    receiving, by the server, a query result that is (i) responsive to the second query, (ii) in the first programming language that embeds a view template specifying the second query as a dynamic query with replaceable parameters, wherein the replaceable parameters of the second query are the second parameters, and (iii) when executed, causes a visual change in the user interface; and
    sending, by the server, the query result in the first programming language to the client.

18. The method of claim 17, wherein the server comprises:
    a request handler configured to select the selected template from the plurality of templates based on the template identifier matching a property of the selected template; and
    a query compiler configured to generate the second query from the first parameter and the selected template after the request handler selects the selected template.

19. The method of claim 17, wherein each of the templates comprise a sequence of subquery assignment statements that assign a data variable of the template to the value of a parameter of one of the group consisting of i) a parameter of a query and ii) a parameter of a template.

20. The method of claim 19, wherein one template in the plurality of templates is an entry point that specifies a beginning of execution, and wherein all other templates are dependent from the entry point.

21. The method of claim 17, wherein:
    the first query does not identify an aggregation of the query results; and
    wherein compiling the first query and the selected template into the second query in the second programming language comprises determining an aggregation of the query results.

22. The method of claim 21, wherein to determining the aggregation of the query results comprises automatically identifying grouping columns in the query results such that rows having the same key values in the grouping columns are to be aggregated.

23. The method of claim 17, wherein the client is configured to:
    present, to a user, a plurality of user interfaces, each user interface being associated with a template of the plurality of templates;
    receive, from the user, input to a particular user interfaces;
    generate the first parameters based on receiving the input;
    determine that the particular user interface is associated with the selected template; and
    send the first query to the server responsive to determining that the particular user interface is associated with the selected template.

* * * * *

UNITED STATES PATENT AND TRADEMARK OFFICE
CERTIFICATE OF CORRECTION

PATENT NO. : 10,452,650 B1
APPLICATION NO. : 15/259872
DATED : October 22, 2019
INVENTOR(S) : Monaharan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this
Eleventh Day of August, 2020

Andrei Iancu
*Director of the United States Patent and Trademark Office*